Jan. 23, 1951   H. H. McCURDY   2,539,260
COLLAPSIBLE POULTRY SHIPPING CRATE
Filed March 29, 1948   3 Sheets-Sheet 1
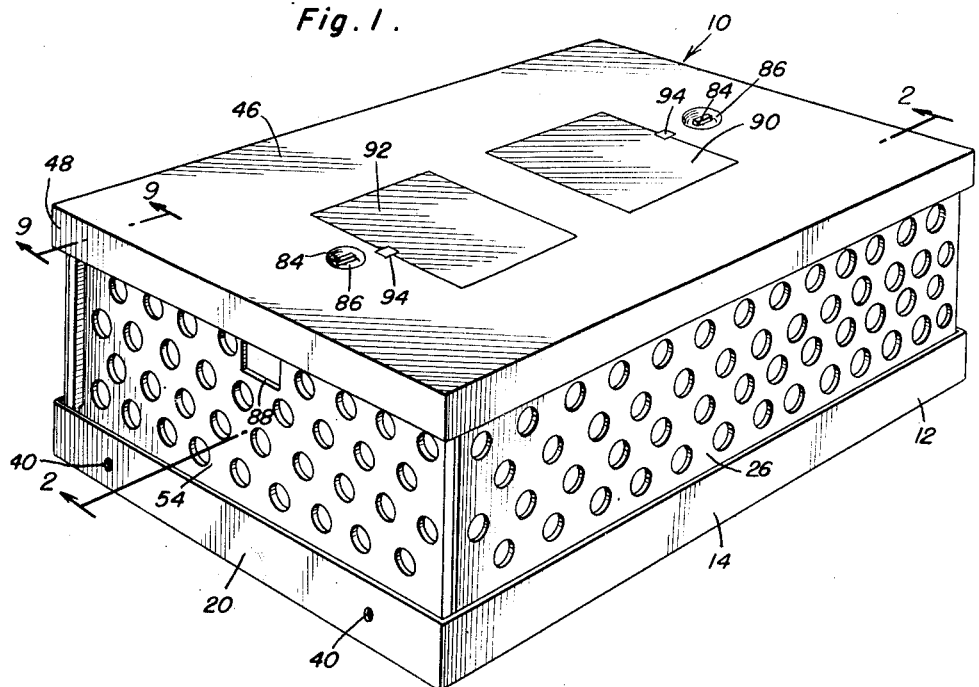
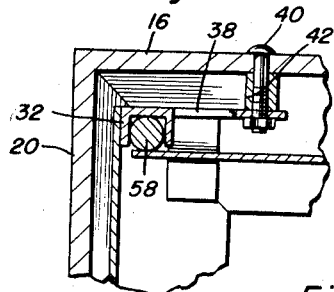
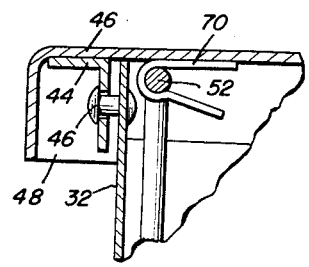
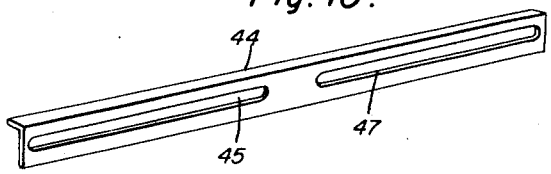
Harold H. McCurdy
INVENTOR.
BY
*Attorneys*

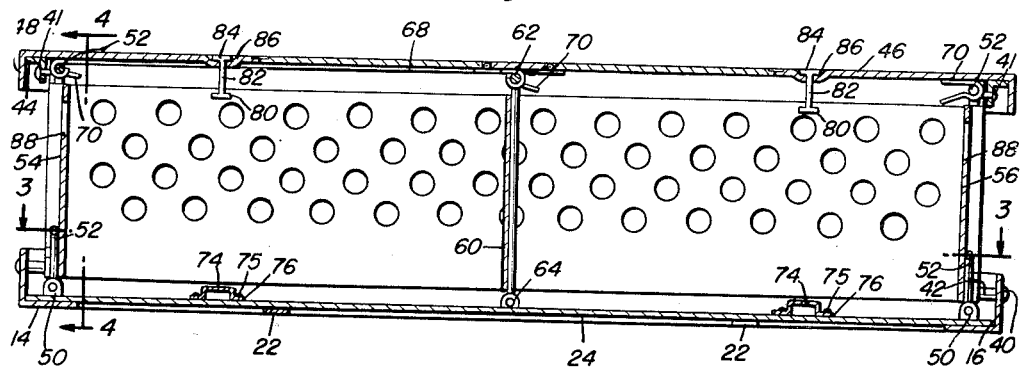
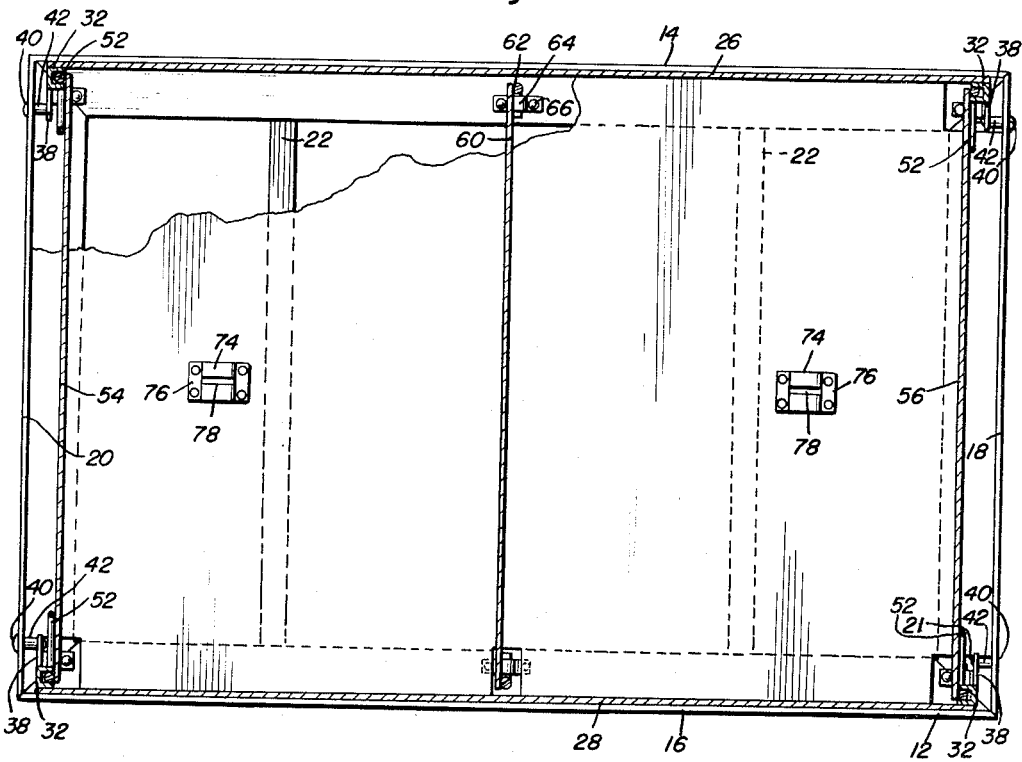

Jan. 23, 1951　　　　　　H. H. McCURDY　　　　　　2,539,260
COLLAPSIBLE POULTRY SHIPPING CRATE
Filed March 29, 1948　　　　　　　　　　　　3 Sheets-Sheet 3

Harold H. McCurdy
INVENTOR.

BY *[signatures]*
Attorneys

Patented Jan. 23, 1951

2,539,260

UNITED STATES PATENT OFFICE 2,539,260

COLLAPSIBLE POULTRY SHIPPING CRATE

Harold H. McCurdy, Astoria, Oreg.

Application March 29, 1948, Serial No. 17,614

5 Claims. (Cl. 220—7)

This invention relates to a crate, constructed and adapted for shipping purposes, and more specifically relates to an improved poultry shipping crate of the type utilized in the transporting of poultry or other small animals.

The principal object of this invention is to enable a farmer or poultry dealer to transport poultry or the like, in a crate without danger of the crate breaking or being damaged, so as to injure the poultry or enable them to escape.

Another object of this invention is to enable a dealer, upon receiving the crate, containing the poultry, to collapse the crate, after removing the poultry and to thereby save storage space and to easily and conveniently re-ship the container or crate back to the farmer or poultry wholesale house.

Another object of this invention is to provide a durable and sturdily connected shipping crate, which is constructed to withstand the jolting and jarring, attending such transporting, and which is designed and constructed to be conveniently folded and opened.

Another object of this invention to be specifically enumerated herein is to provide a collapsible shipping crate, easily folded and secured in an inoperative position and easily and conveniently raised and locked in an open or operative position, which is inexpensive to manufacture, reliable, efficient and durable in use and adapted for employment for transporting, storing, or the like, any type of small live animal.

These and ancillary objects are attained by this invention, a preferred embodiment of which is set forth in the following description and illustrated in the accompanying drawings, wherein:

Figure 1 is a perspective view of a collapsible crate, constructed in accordance with the principles of this invention;

Figure 2 is a vertical sectional view taken substantially on the longitudinal plane of line 2—2 of Figure 1;

Figure 3 is a bottom plan view of the collapsible crate, with a portion of the bottom plate broken away to illustrate the means for collapsing the ends and partition sections;

Figure 8 is a sectional view of the corner assembly, taken substantially on the plane of line 8—8 of Figure 4;

Figure 9 is a sectional view taken substantially on the line 9—9 of Fig. 1, and

Figure 10 is a view in perspective of the slotted angle bar, employed to vertically move the top member, relative the base frame.

Figure 4:
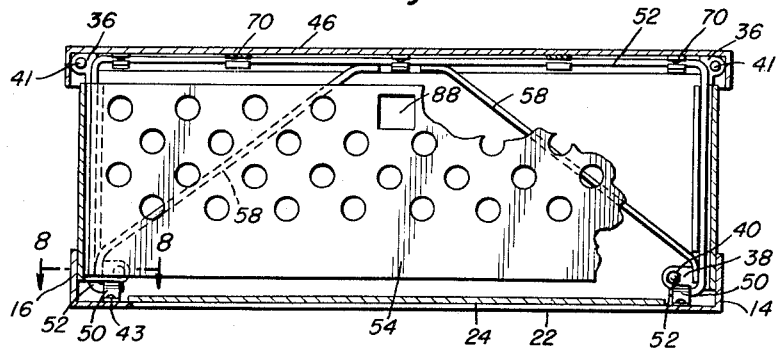
Figure 4 is a transverse vertical sectional view taken substantially on the plane of line 4—4 of Figure 2.
Figure 5:
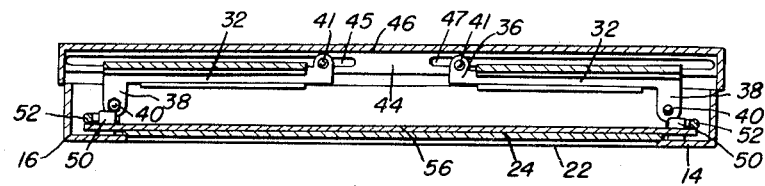
Figure 5 is a crosswise sectional view, showing the crate in folded position.
Figure 6:
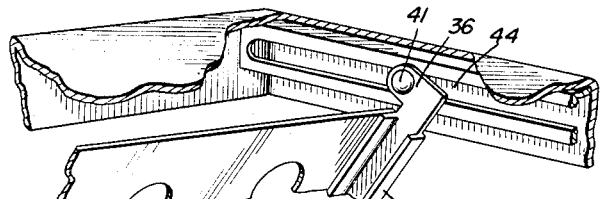
Figure 6 is a fragmentary perspective view, showing the end sections in folded placement on the bottom plate and the side section and top cover in fragmentary portions.
Figure 7:
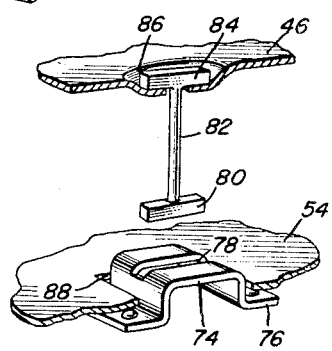
Figure 7 is a fragmentary perspective view of the means provided for securing or locking the crate when in a folded or inoperative position.

Referring now more particularly to the drawings, wherein a preferred embodiment of this invention is illustrated, by way of example only, and wherein similar characters of reference designate corresponding parts throughout, 10 denotes generally a collapsible poultry crate constructed in accordance with the principles of this invention and comprising a base frame 12, composed of longitudinally extending opposed side angle irons 14 and 16, suitably connected at their respective ends by cross bars or end forming angle irons 18 and 20. The angle irons, forming the angle iron base frame 12, are suitably joined at their respective ends by bracket plates 21 which seat upon the juncture point of the angle irons and are connected thereto. The angle iron base frame 12, extends upwardly a spaced distance forming semi-sides and semi-ends for the collapsible crate 10 and forming seat portions for the top cover, which is seated thereon, when the crate is collapsed.

Base frame bars, 22, extend transversely of the longitudinally extending angle iron side sections 14 and 16 and are suitably secured thereto as by welding or the like, forming brace bars or support bars, upon which the bottom section 24 seats. The bottom section 24 may be constructed of any suitable material, preferably a strong and durable material, such as iron, heavy wood or the like, and is detachably seated on the brace bars and the opposed angle irons so that it may be easily and conveniently removed, for cleaning purposes or the like.

Pivotally secured to the opposing end angle irons 18 and 20 are opposing longitudinal side sections 26 and 28, respectively. The sides 26 and 28 may be formed from any suitable material, such as perforated panel board, heavy chicken wire, or the like and are constructed to fold in and seat on the bottom member 24, when the crate is collapsed and to be secured or locked in vertical position, when the crate is in use. The sides 26 and 28 are secured at their ends to channel bars 32, having oppositely extending terminating arms 38 and 36, said arms being perforated, adjacent their ends. Terminating arm 38 is pivoted to the upraised portion of the angle irons 18 and 20, by means of a detachable pivot pin 40. Spacing bushings or washers 42, are employed to space the arm 38 from the side of the angle iron.

The oppositely extending arm 36, has disposed within its aperture or perforation a rivet 41, which is slidably received within a slotted angle iron 44 suitably secured to the depending end flanges 48 of the top member 46.

Bolted, welded or otherwise suitably secured to the opposing ends of the angle irons 18 and 20, and seated on the connecting plates 22 are bearing blocks or upraised apertures or perforated bosses 50. Substantially U-shaped rods 52, having inturned terminating leg portions which are inserted and pivotally received with the perforated bearing blocks 50, are disposed oppositely on the end angle irons 18 and 20 and are secured to the end sections 54 and 56 of the crate. Rigidifying bars or straps 58 are welded to the medial portion of the U-shaped rods at one end and to the leg portions of the rod, forming a substantially V-shaped brace support for the rods 52.

Medially disposed on the longitudinally extending angle irons 18 and 14 and extending transversely thereof is a partition section 60, secured to a substantially U-shaped rod 62, having its leg terminating portions inturned and suitably secured within bearing blocks or brackets 64, which are secured or seated on the angle irons by means of the bolts 66. A pair of spaced connecting rods 68 are secured to one of the end U-shaped rods and to the medial rod 62, so that the partition 60 and one of the end sections, 54, move inwardly and seat on the base portion simultaneously.

Suitable means are provided to lock or retain the crate in a closed or open position. The means preferred for retaining the crate in an open or extended position include springs clips or clamps 70 which are secured to the top member 46 on the inner surface thereof in spaced relation relative to the extended position of the U-shaped rods 52, which are disposed on the ends thereof, and the partition 60. When the rods are moved into vertical placement, they are clamped within the spring clips 70 and securely retained therein, so that the end sections 54 and 56 are retained in a vertical position.

Therefore, it is apparent that when the crate is in a folded position the end sections 54 and 56 rest or are seated directly upon the bottom member 24. The opposing longitudinal sides 26 and 28 are seated in an inturned folded position on the end sections and the top member 46, having its depending flange resting on the upturned portion of the angle iron base frame, is seated upon the base frame and the side sections, forming a compact unit.

When the crate is in such a folded position, suitable means are provided to retain or securely lock the crate. The means preferred, comprises a locking member 74, comprising a bracket having depending legs and laterally extending terminating portions 76, which are suitably bolted or otherwise secured to the floor or bottom portions 24 of the crate. The upstanding portion is suitably slotted as at 78 so as to receive therein a locking pin 82, which is carried by the top member 46. The locking pin 82 is formed with shank and opposed transverse ends 80 and 84, the latter being seated within a recess 86 formed in the top member. Thus, when the crate is in folded position, the handle portion 84 of the locking pin, having its locking section 80, inserted in the slot 78 of the locking member 74, is rotated or twisted in semi-circular direction, so that the locking end 80 is twisted under the locking member 74, thereby forming a secured locking arrangement. To unlock the crate, for adjusting it in a raised position, it is only necessary to turn the handle 84 a half turn moving the locking pin 80 in alignment with the slot 78.

Then, the sides are pulled upwardly by grasping cut out handle portion 88 and pulling the ends upwardly. As the ends move upwardly, the sides 26 and 28 correspondingly move upwardly, raising the top member 46, by means of the rivet pins 41, which are inserted within the slots 45 and 47 of the slotted angle irons 44, secured to the depending flange 48 of the top member.

Disposed on the top member 46, on opposite sides of the partition 60, are hinged doors 90 and 92, which are suitably secured by latches 94. Thus, by moving the latches 94 the doors 90 and 92 may be swung in on their respective hinges and articles may be conveniently placed in or removed from the interior of the crate.

Thus, it is to be apparent that there has been provided a compact, durable, and efficient shipping or transporting crate, which may be, conveniently, raised in an operative position or may be easily and swiftly folded to a collapsed position, and securely locked in either position.

Many objectives and purposes of this invention will become apparent to those skilled in the art, upon a perusal of the above description, in view of the accompanying drawings, it is to be understood that certain changes in style, size and arrangement of parts may be effected, without departure from the spirit of the invention within the scope of the appended claims.

Having described the invention, what is claimed as new is:

1. A collapsible crate, comprising a bottom section having an upstanding rectangular rim, pivot pins projecting inwardly from the opposing ends of the rim adjacent the sides thereof, opposing side sections, members secured vertically to the opposing ends of the side sections, said members being formed with oppositely directed upper and lower arms, said lower arms being rotatably disposed on the pivot pins, a top section having a depending rectangular rim adapted to seat upon the rim on the bottom section, slideways formed in the opposing ends of the rim for the top section, means carried by the upper arms slidably disposed in the slideways, opposing end sections, U-shaped support rods for said end sections pivotally secured at their lower ends on the bottom section, locking means carried by the top section engageable with the rods for retaining the end and side sections in a raised position and interengaging means associated with the top and bottom sections for locking the top section in a seated collapsed position on the bottom section with the side and end sections folded between the top and bottom sections.

2. A collapsible crate, comprising a bottom section having an upstanding rectangular rim, pivot pins projecting inwardly from the opposing ends of the rim adjacent the sides thereof, opposing side sections, members secured vertically to the opposing ends of the side sections, said members being formed with oppositely directed upper and lower arms, said lower arms being rotatably disposed on the pivot pins, a top section having a depending rectangular rim adapted to seat upon the rim on the bottom section, slideways formed in the opposing ends of the rim for the top section, means carried by the upper arms slidably disposed in the slideways, opposing end sections U-shaped support rods for said end sections pivotally secured at their lower ends on the bottom section, locking means carried by the top section engageable with the rods for retaining the end and side sections in a raised position and interengaging means associated with the top and bottom sections for locking the top section in a seated collapsed position on the bottom section with the side and end sections folded between the top and bottom sections, a partition member, pivoted to the bottom section intermediate of the end sections and transversely of the side sections, connecting rods between one of the end sections and the partition member whereby said partition member responds to movement of the end section and locking means depending from the top section for retaining the partition member in a raised position.

3. The combination of claim 1, wherein said support rods for the end sections are pivoted inwardly of the members for the side sections so that the side sections are supported in a raised position by the end sections.

4. The combination of claim 1, wherein said locking means engageable with the rods includes resilient clips carried by the top section in the arcuate path of movement of the rods.

5. The combination of claim 1, wherein said interengaging means includes a handle rotatably carried by the top section and slidably disposed vertically therein, an offset inner end on said handle and a socket member complementary to said inner end secured on the bottom section.

HAROLD H. McCURDY.

REFERENCES CITED

The following references are of record in the file of this patent:

UNITED STATES PATENTS

| Number | Name | Date |
|---|---|---|
| 844,955 | Morgan | Feb. 19, 1907 |
| 924,082 | Mable | June 8, 1909 |
| 929,718 | Smith | Aug. 3, 1909 |
| 1,314,862 | Eyler | Sept. 2, 1919 |
| 1,413,149 | Worley | Apr. 18, 1922 |
| 1,534,672 | Stewart | Apr. 21, 1925 |
| 1,835,535 | Stocker | Dec. 8, 1931 |
| 2,231,619 | Fenton | Feb. 11, 1941 |
| 2,378,481 | Lease | Apr. 10, 1945 |